United States Patent
Terauchi et al.

[11] Patent Number: 5,911,566
[45] Date of Patent: Jun. 15, 1999

[54] ROTATION PREVENTING MECHANISM HAVING STABILIZED OPERATION AND A SCROLL-TYPE FLUID DISPLACEMENT APPARATUS COMPRISING THE ROTATION PREVENTING MECHANISM

[75] Inventors: Kiyoshi Terauchi, Isesaki; Norio Kitano, Fujioka; Jiro Iizuka, Takasaki, all of Japan

[73] Assignee: Sanden Corporation, Gunma, Japan

[21] Appl. No.: 08/861,021

[22] Filed: May 21, 1997

[30] Foreign Application Priority Data

May 21, 1996 [JP] Japan .................................. 8-125340

[51] Int. Cl.$^6$ ................................. F01C 1/04; F16D 3/04
[52] U.S. Cl. .................................... 418/55.3; 464/103
[58] Field of Search .......................... 418/55.3; 464/103

[56] References Cited

U.S. PATENT DOCUMENTS

| 3,647,268 | 3/1972 | Haines et al. | 308/193 |
| 4,259,043 | 3/1981 | Hidden et al. | 418/55.3 |
| 4,406,600 | 9/1983 | Terauchi et al. | 418/55.3 |
| 4,474,543 | 10/1984 | Hiraga et al. | 418/55.3 |
| 5,738,504 | 4/1998 | Kitano | 418/55.3 |

FOREIGN PATENT DOCUMENTS

| 63-179185 | 7/1988 | Japan . |
| 05033811 | 2/1993 | Japan . |
| 5033811 | 2/1993 | Japan . |
| 05087131 | 4/1993 | Japan . |
| 5126140 | 5/1993 | Japan . |

*Primary Examiner*—John J. Vrablik
*Attorney, Agent, or Firm*—Baker & Botts, L.L.P.

[57] ABSTRACT

In a rotation preventing mechanism in which a ball (26) is interposed between a pair of races (24, 25) each having a rolling groove surface (24c, 25c) receiving the ball, the rolling groove surface has a bottom portion (24c3, 25c3) of a radius of curvature which is greater than each of those of an outer peripheral portion (24c1, 24c2) and an inner peripheral portion (25c2, 25c2). Each of the radii of the outer peripheral and the inner peripheral portions is approximate to and greater than the radius of the ball. The races are attached to a front housing (10b) and a movable scroll member (20) which carries out orbital motion along a predetermined orbit with respect to the front housing. The rolling groove surface has an annular shape corresponding to the predetermined orbit.

9 Claims, 7 Drawing Sheets

ROTATION PREVENTING MECHANISM HAVING STABILIZED OPERATION AND A SCROLL-TYPE FLUID DISPLACEMENT APPARATUS COMPRISING THE ROTATION PREVENTING MECHANISM

BACKGROUND OF THE INVENTION

This invention relates to a rotation preventing mechanism for preventing an orbiting member from being rotated relative to a fixed member, and to a scroll-type fluid displacement apparatus comprising the rotation preventing mechanism.

For example, Japanese Unexamined Patent Publications (JP-A) Nos. 33811/1993 and 87131/1993 disclose scroll-type compressors or fluid displacement apparatus with rotation preventing mechanisms. Each of the scroll-type compressors has a fixed member, an orbiting member carrying out orbital motion or revolution with respect to the fixed member, a pair of races attached to the fixed member and the orbiting member, respectively, to face each other, and a ball interposed between the races. More specifically, each of the races has a rolling groove surface which has an annular shape corresponding to an orbit of the orbital motion. The ball is received by the rolling groove surface to inhibit rotation of the orbiting member during the orbital motion. The rolling groove surface has a radius of curvature substantially equal to a radius of the ball in a cross-section thereof.

In the above-mentioned rotation preventing mechanism, one of the races which is attached to the orbiting member revolves or orbits along the orbit of the orbital motion to have an orbiting radius determined by the rolling groove surface. In a design stage, it is supposed that the ball rolls along the bottom of the rolling groove surface.

In practical manufacture, however, dimensional tolerance of parts and dislocation In assembling are inevitable. This results in a dimensional difference between the radius of the rolling groove surface and the actual orbiting radius of the above-mentioned one race. Therefore, the ball may be shifted from the bottom of the rolling groove surface to climb up an outer or an inner peripheral portion of the rolling groove surface. In this event, the races are subjected to thrust force from the ball along different lines of action.

In addition, since the climbing level of the ball fluctuates, a supporting portion which actually supports the orbiting member or a movable scroll member of the scroll-type compressor may be worn or deformed due to the thrust force. As a result, the rotation preventing mechanism is shortened in its lifetime.

Furthermore, such fluctuation in climbing level of the ball results in unreliable support of the orbiting member and presence of a gap between the orbiting member and the fixed member. Thus, compression efficiency of the scroll-type compressor is deteriorated.

SUMMARY OF THE INVENTION

It is therefore an object of this invention to provide a rotation preventing mechanism in which a ball is inhibited from climbing up an outer or an inner peripheral portion of a rolling groove surface.

It is another object of this invention to provide a scroll-type fluid displacement apparatus which is excellent in its displacement efficiency.

Other objects of this invention will become clear as the description proceeds.

A rotation preventing mechanism to which this invention is applicable is for preventing an orbiting member from being rotated relative to a fixed member. The orbiting member carries out orbital motion along a predetermined orbit with respect to the fixed member, The rotation preventing mechanism comprises a pair of races attached to the fixed and the orbiting members, respectively, to face each other, and a ball interposed between the races. Each of the races has a rolling groove surface which has an annular shape corresponding to the predetermined orbit and receives the ball.

According to an aspect of this invention, the rolling groove surface in the rotation preventing mechanism comprises an outer peripheral portion having a first radius of curvature in a cross-section thereof, the first radius being approximate to and greater than a radius of the ball, an inner peripheral portion having a second radius of curvature in a cross-section thereof, the second radius being approximate to and greater than a radius of the ball, and a bottom portion connected between the outer and the inner peripheral portions and having a third radius of curvature in a cross-section thereof, the third radius being greater than each of the first and the second radii.

According to another aspect of this invention, the rolling groove surface in the rotation preventing mechanism has a cross-section along an ellipse having a major axis oriented in a radial direction of the annular shape.

According to this invention, there is provided a scroll-type fluid displacement apparatus comprising, in addition to the above-mentioned rotation preventing mechanism, a fixed scroll member connected to the fixed member, and a movable scroll member connected to the orbiting member and cooperated with the fixed scroll member for causing fluid displacement in response to the orbital motion of the orbiting member.

DESCRIPTION OF THE PREFERRED EMBODIMENTS

In order to facilitate an understanding of this invention, description will at first be made about a conventional scroll-type compressor as fluid displacement apparatus with a rotation preventing mechanism.

Figure 1:
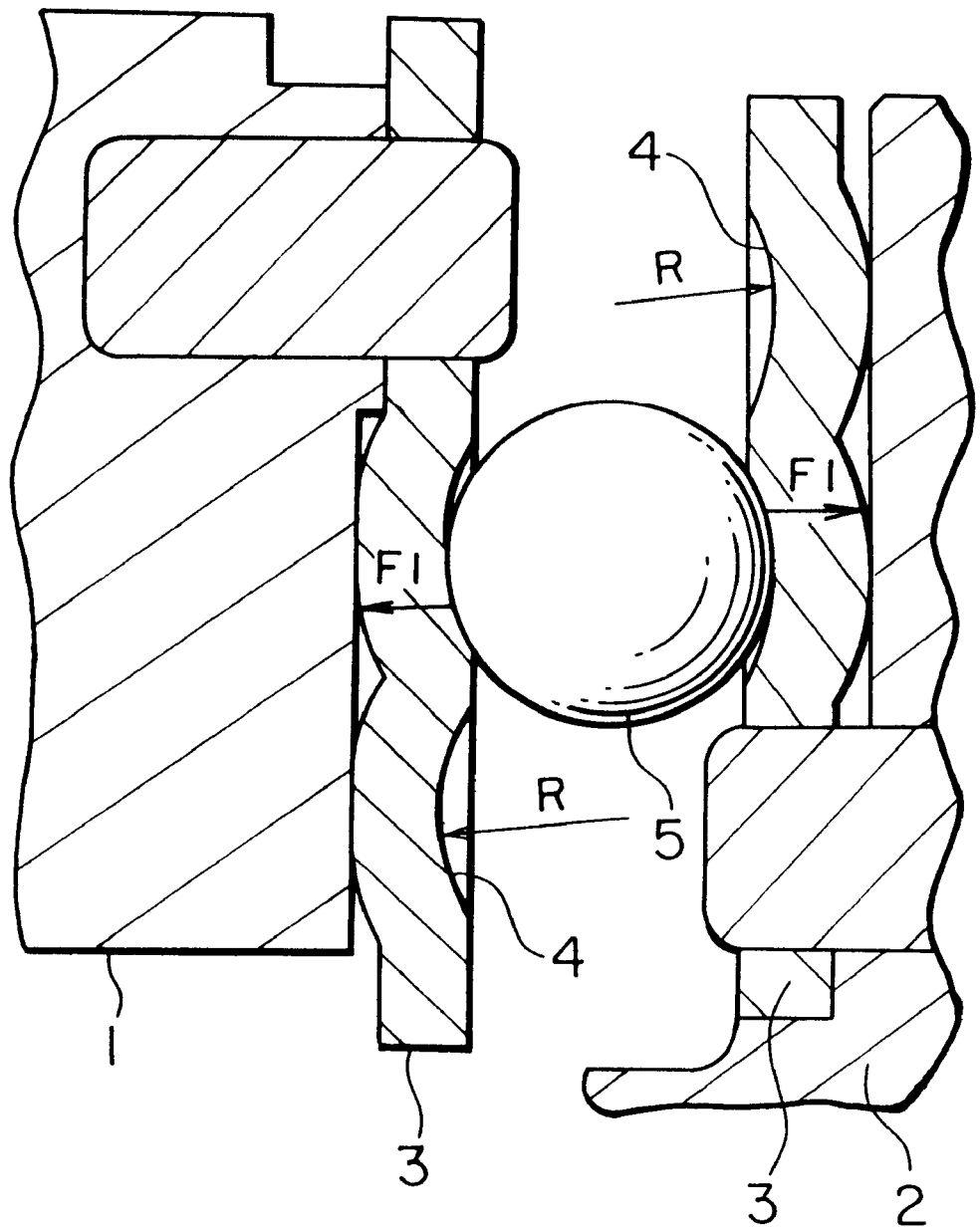
FIG. 1 is an enlarged sectional view of a characteristic part of a conventional scroll-type compressor with a rotation preventing mechanism.

Referring to FIG. 1, the conventional scroll-type compressor has a fixed member 1, an orbiting member 2 carrying out orbital motion or revolution with respect to the fixed member 1, a pair of race members 3 attached to the fixed member 1 and the orbiting member 2, respectively, to face each other, and a plurality of balls 5 (only one being illustrated in the figure) interposed between the race members 3 to form a ball coupling structure as the rotation preventing mechanism. More specifically, each of the race members 3 has one surface provided with a plurality of rolling groove surfaces 4 (only one being illustrated in the figure) each of which has an annular shape corresponding to an orbit of the orbital motion. The balls 5 are received by the rolling groove surfaces 4 to inhibit rotation of the orbiting member 2 during the orbital motion. Each rolling groove surface 4 is a curved surface having a radius of curvature R substantially equal to a radius of each ball 5.

In the above-mentioned rotation preventing mechanism, one of the race members 3 attached to the orbiting member 2 revolves along the orbit of the orbital motion and has an orbiting radius defined by a radius of the rolling groove surface 4. In a design stage, it is supposed that each ball 5 rolls along the bottom of each rolling groove surface 4.

The conventional scroll-type compressor has those disadvantages described in the preamble of the present specification.

Now, the description will be made about this invention in conjunction with a few preferred embodiments thereof with reference to the drawing.

Figure 2:
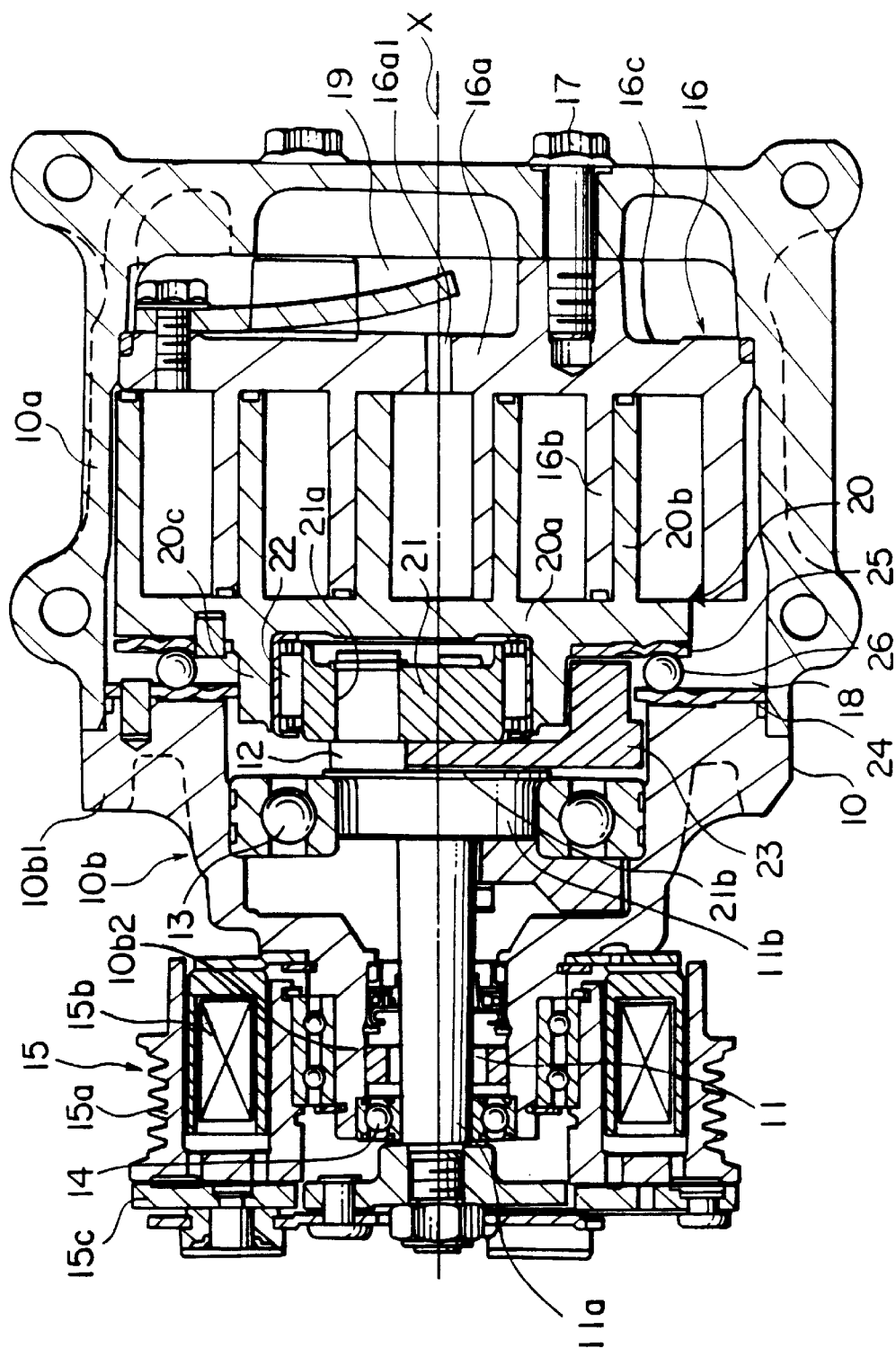
FIG. 2 is a vertical sectional view of a scroll-type compressor with a rotation preventing mechanism according to a first embodiment of this invention.

Referring to FIG. 2, a scroll-type compressor with a rotation preventing mechanism according to a first embodiment of this invention comprises a housing 10 as a fixed member. The housing 10 is composed of a rear housing 10*a* comprising a large-diameter cylindrical member with an open end and a closed end, and a front housing 10*b* fixed to the open end of the rear housing 10*a*. The front housing 20*b* comprises a large-diameter cylindrical portion 10*b*1 and a small-diameter cylindrical portion 10*b*2. The rear housing 10*a* and the front housing 10*b* are concentric with each other.

A shaft 11 is disposed along a shaft center axis X of the housing 10 and extends within the front housing 10*b* through the small-diameter cylindrical portion 10*b*2. The shaft 11 has a small-diameter portion 11*a* surrounded by the small-diameter cylindrical portion 10*b*2 of the front housing 10*b*, and a large-diameter portion 11*b* surrounded by the large-diameter cylindrical portion 10*b*1 of the front housing 10*b*. The large-diameter portion 11*b* is connected to a drive pin 12 fixed to an end surface thereof and extending in parallel to the shaft center axis X to be eccentric from the shaft center axis X. The shaft 11 is rotatably supported by the front housing 10*b*. Specifically, the large-diameter portion 11*b* is rotatably supported through a ball bearing 13 by the large-diameter cylindrical portion 10*b*1 of the front housing 10*b*. The small-diameter portion 11*a* is rotatably supported through a ball bearing 14 by the small-diameter cylindrical portion 10*b*2 of the front housing 10*b*.

An electromagnetic clutch 25 is radially outwardly disposed on the small-diameter cylindrical portion 10*b*2 of the front housing 10*b*. The electromagnetic clutch 15 is externally fitted to the small-diameter cylindrical portion 10*b*2 of the front housing 10*b* to be rotatable. The electromagnetic clutch 15 comprises a pulley 15*a* connected to an external drive source (not shown) through a V belt (not shown), an exciting coil 15*b* fixed to the small-diameter cylindrical portion 10*b*2 of the front housing 10*b*, and a rotation transfer plate 15*c* fixed to an end of the small-diameter portion 11*a* of the shaft 11. The shaft 11 is rotated by the external drive source (not shown) through the electromagnetic clutch 15.

A fixed scroll member 16 is disposed within the rear housing 10*a*. The fixed scroll member 16 comprises a disk-shaped end plate 16*a* concentric with the shaft center axis X and fitted to the rear housing 10*a*, a first wrap member 16*b* formed on one surface of the end plate 16*a*, and a leg 16*c* formed on the other surface of the end plate 16*a*. The end plate 16*a* is provided with a discharge hole 16*a*1 formed at its center. The fixed scroll member 16 is fixed to the rear housing 10*a* through a bolt 17 with the leg 16*c* kept in contact with a bottom end 10*a*1 of the rear housing 10*a*. An internal cavity of the rear housing 10*a* is partitioned by the end plate 16*a* of the fixed scroll member 16 into a suction chamber 18 and a discharge chamber 19.

Within the rear housing 10*a*, a movable scroll member 20 as an orbiting member is disposed adjacent to the fixed scroll member 16. The movable scroll member 20 comprises a disk-shaped end plate 20*a*, a second wrap member 20*b* formed on one surface of the end plate 20*a*, and an annular boss 20*c* formed on the other surface of the end plate 20*a*. The end plate 20*a* has a plate center axis eccentric from the shaft center axis X by a predetermined distance which will later be called an orbiting radius. The second wrap member 20*b* of the movable scroll member 20 is engaged with the first wrap member 16*b* of the fixed scroll member 16 with an angular offset of 180°.

In the boss 20*c*, a thick disk-shaped bushing 21 concentric with the end plate 20*a* is internally fitted through a needle bearing 22 to be rotatable. The bushing 21 is provided with an eccentric through hole 21*a* extending in parallel to the shaft center axis X. A balance weight 23 is fixed to the bushing 21 to extend in a radial direction. The through hole 21*a* slidably receives the drive pin 12 fixed to the large-diameter portion 11*b* of the shaft 11. The bushing 21 is provided with a pin 21*b* fitted into a hole formed at the end surface of the large-diameter portion 11*b* of the shaft 11 and having a diameter slightly greater than that of the pin 21*b*.

A fixed-side race 24 is fixed to an end of the large-diameter cylindrical portion 10*b*1 of the front housing 10*b*. A movable-side race 25 is fixed to the end plate 20*a* of the movable scroll member 20. A plurality of balls 26 are interposed between the fixed-side and the movable-side races 24 and 25 with a space left from one another in a circumferential direction. A combination of the fixed-side race 24, the movable-side race 25, and the balls 25 forms the rotation preventing mechanism for inhibiting rotation of the movable scroll member 20.

Figures 3A, 3B:
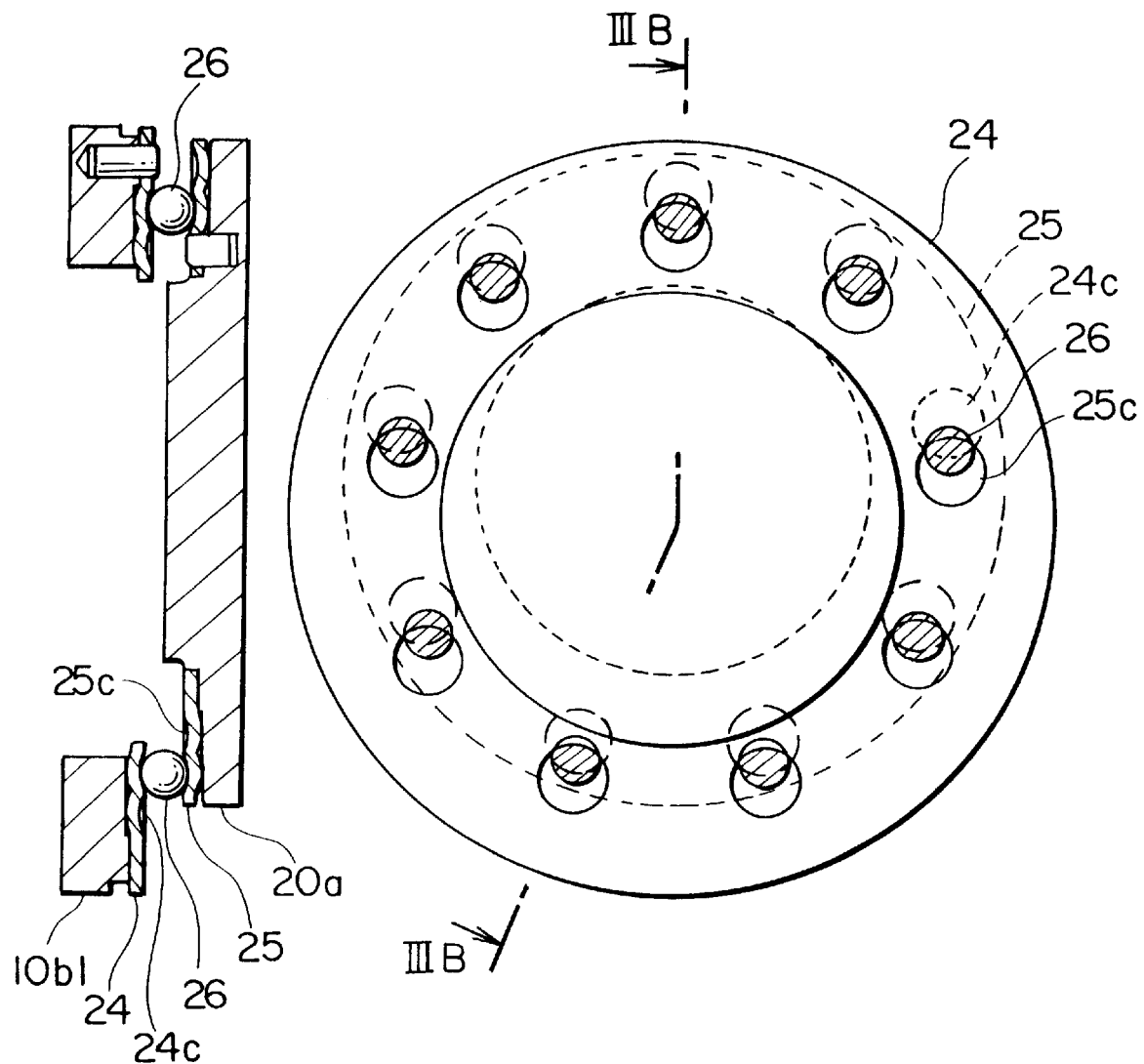
FIG. 3A is a front view of the rotation preventing mechanism illustrated in FIG. 2.
FIG. 3B is a sectional view taken along a line IIIB—IIIB in FIG. 3A.

Referring to FIGS. 3A and 3B, the description will be directed to the rotation preventing mechanism. Each of the fixed-side and the movable-side races 24 and 25 is manufactured from iron or chromium-molybdenum steel by press forming and has an annular shape. The fixed-side race 24 is provided with a plurality of rolling groove surfaces 24*c* formed on one surface thereof with a space left from one another in a circumferential direction. Likewise, the movable-side race 25 is provided with a plurality of rolling groove surfaces 25*c* formed on one surface thereof with a space left from one another in a circumferential direction. The rolling groove surfaces 24*c* are faced to the rolling groove surfaces 25*c* in one-to-one correspondence. The balls 26 of bearing steel are interposed between the fixed-side and the movable-side races 24 and 25 and clamped by the rolling groove surfaces 24*c* of the fixed-side race 24 and the rolling groove surfaces 25*c* of the movable-side race 25.

Figure 4:
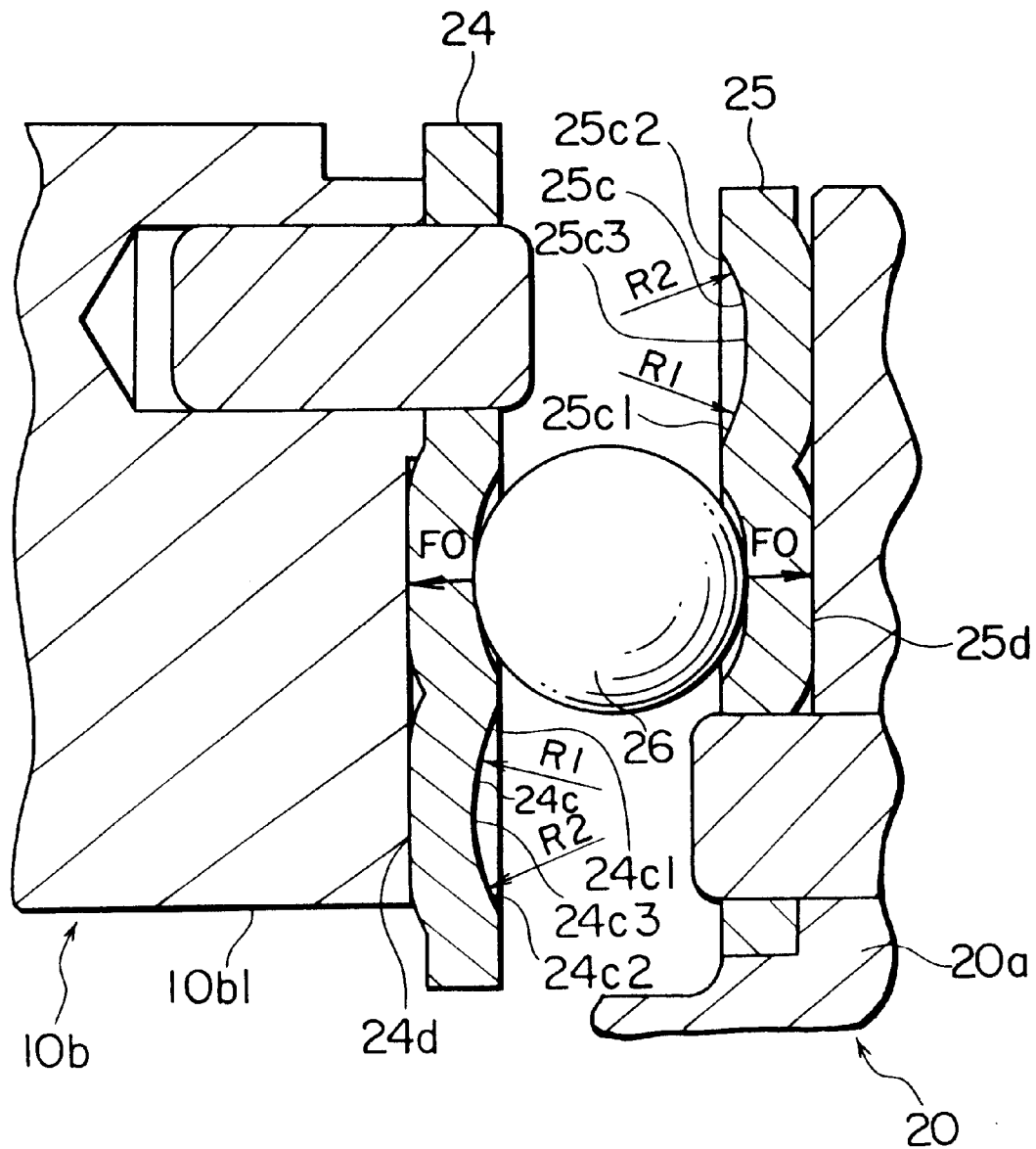
FIG. 4 is an enlarged sectional view of a characteristic part of the rotation preventing mechanism illustrated in FIG. 3.

Referring to FIG. 4, each rolling groove surface 24c comprises an inner peripheral portion 24c1 which is a curved surface having a radius of curvature R1, an outer peripheral portion 24c2 which is a curved surface having a radius of curvature R2, and a bottom portion 24c3 connecting the inner and the outer peripheral portions 24c1 and 24c2. Likewise, each rolling groove surface 25c comprises an inner peripheral portion 25c1 which is a curved surface having a radius of curvature R1, an outer peripheral portion 25c2 which is a curved surface having a radius of curvature R2, and a bottom portion 25c3 connecting the inner and the outer peripheral portions 25c1 and 25c2. The radius of curvature R1 of each of the inner peripheral portions 24c1 and 25c1 may be equal to or may be slightly different from the radius of curvature R2 of each of the inner and the outer peripheral portions 24c2 and 25c2. At any rate, the radius of curvature R1 or R2 is selected to be approximate to and greater than the radius of each ball 26, namely, to be slightly greater than the radius of each ball 26.

The bottom portion 24c3 is a flat surface defined by tangents of the inner and the outer peripheral portions 24c1 and 24c2. Likewise, the bottom portion 25c3 is a flat surface defined by tangents of the inner and the outer peripheral portions 25c1 and 25c2. In other words, the bottom portion 24c3 is an analytical-geometric curved surface smoothly connected to the inner and the outer peripheral portions 24c1 and 24c2 and having an infinite radius of curvature. Likewise, the bottom portion 25c3 is an analytical-geometric curved surface smoothly connected to the inner and the outer peripheral portions 25c1 and 25c2 and having an infinite radius of curvature. The center diameter of each of the bottom portions 24c3 and 25c3 is selected to be substantially equal to the orbiting radius of the orbital motion of the movable scroll member 20. The width of each of the bottom portions 24c3 and 25c3 is selected to be approximately equal to one third of an effective rolling track width, namely, a width of each of the rolling groove surfaces 24c and 25c. Preferably, the width of each of the bottom portions 24c3 and 25c3 is selected with reference to profile error in the scroll members, positional error in attaching the races, and positional error in forming the rolling grooves.

On the other hand, flat portions 24d and 25d are formed on the other surfaces of the fixed-side and the movable-side races 24 and 25, respectively. The flat portions 24d and 25d are greater in width than the bottom portions 24c3 and 25c3, respectively. Accordingly, the fixed-side race 24 is brought into contact with and supported by the large-diameter cylindrical portion 10b1 of the front housing 10b over the width greater than that of the bottom portion 24c3. Likewise, the movable-side race 25 is brought into contact with and supported by the end plate 20a of the movable scroll member 20 over the width greater than that of the bottom portion 25c3. Thus, each of the large-diameter cylindrical portion 10b1 and the end plate 20a serves as a race support member.

Turning back to FIG. 2, the description will be made about an operation of the scroll-type compressor with the above-mentioned ball coupling structure. At first, the shaft 11 is driven by the external drive source (not shown) through the electromagnetic clutch 15 to be rotated. When the shaft 11 is rotated, the bushing 21 revolves around the shaft center axis X so that the movable scroll member 20 revolves around the shaft center axis X. In the meanwhile, the involute members 20b and 16b of the movable and the fixed scroll members 20 and 16 are engaged with each other to form a cavity therebetween as a compression chamber. Following the orbital motion of the movable scroll member 20, the compression chamber is reduced in volume and moved inwards in the involute members 20 and 16.

As a result, a fluid flowing from an external fluid circuit into the suction chamber 18 through a suction port (not shown) formed in the housing 10 is introduced into the compression chamber through peripheral edges of the both involute members 20 and 16 and compressed within the compression chamber into a compressed fluid. The compressed fluid flows from the compression chamber through a discharge hole 16a1 formed in the fixed scroll member 16 into the discharge chamber 19. Then, the compressed fluid flows from the discharge chamber 19 through a discharge port (not shown) formed in the rear housing 10a to the external fluid circuit.

During compression, the movable scroll member 20 is subjected to reactive force along the center axis X and anti-rotation force in a radial direction. The reactive force and the anti-rotation force are transmitted through the movable-side race 25, the balls 26, and the fixed-side race 24 to the front housing 10b.

Following the orbital motion of the movable scroll member 20, each ball 26 rolls within the rolling groove surfaces 24c and 25c along a circular orbit having a diameter substantially equal to the orbiting radius rs of the movable scroll member 20. Each of the bottom portions 24c3 and 25c3 of the rolling groove surfaces 24c and 25c has a diameter d0 selected to be substantially equal to the orbiting radius rs of the movable scroll member 20. Therefore, the ball 26 can smoothly and stably rolls along the above-mentioned circular orbit in press contact with the bottom portions 24c3 and 25c3 of the rolling groove surfaces 24c and 25c. As a result, the movable scroll member 20 revolves with a predetermined angular relationship kept from the front housing 10b and, in turn, from the fixed scroll member 16.

Upon the orbital motion of the movable scroll member 20, the movable scroll member 20 tries to rotate around the bushing 21. However, such rotation of the movable scroll member 90 is inhibited because rolling of the ball 26 is restricted within the rolling groove surfaces 24c and 25c.

At this time, the ball 26 rolls substantially along the bottom portions 24c3 and 25c3 of the rolling groove surfaces 24c and 25c. Specifically, even if a dimensional difference is present between the radius of each of the rolling groove surfaces 24c and 25c and the actual orbiting radius of the movable-side race 25 as a result of dimensional tolerance of parts and dislocation in assembling, the ball 26 is substantially completely inhibited from being shifted from the bottom portions 24c3 and 25c3 of the rolling groove surfaces 24c and 25c to climb up the curved surfaces, namely, the inner peripheral portions 24c1 and 25c1 or the outer peripheral surfaces 24c2 and 25c2. In addition, the fixed-side and the movable-side races 24 are subjected to thrust force F0 from the ball 26 along the lines of action substantially coincident with each other along the axial direction.

Generally, in the scroll-type compressor, it is necessary to produce resistant force against the reactive force applied to the movable scroll member 20 during compression. To produce the resistant force, the ball 26 is received with urging force from the bottom portions 24c3 and 25c3 towards the inner and the outer peripheral portions 24c1, 25c1, 24c2, and 25c2. At this time, if the other surfaces or back surfaces of the fixed-side and the movable-side races 24 and 25 are curved, the fixed-side and the movable-side races 24 and 25 are responsive to component force of the urging force to repeat fretting action or engagement/ disengagement with respect to the race support member. This brings about fretting wear known in the art. In view of the above, the flat portions 24d and 25d are formed at the back surfaces of the fixed-side and the movable-side races 24 and 25 as described above. With this structure, surface pressure between the race support member and each race is effectively reduced. In addition, each race is prevented from floating up from the race support member at a position under the ball 26. It is therefore possible to prevent the fretting wear.

Figure 5:
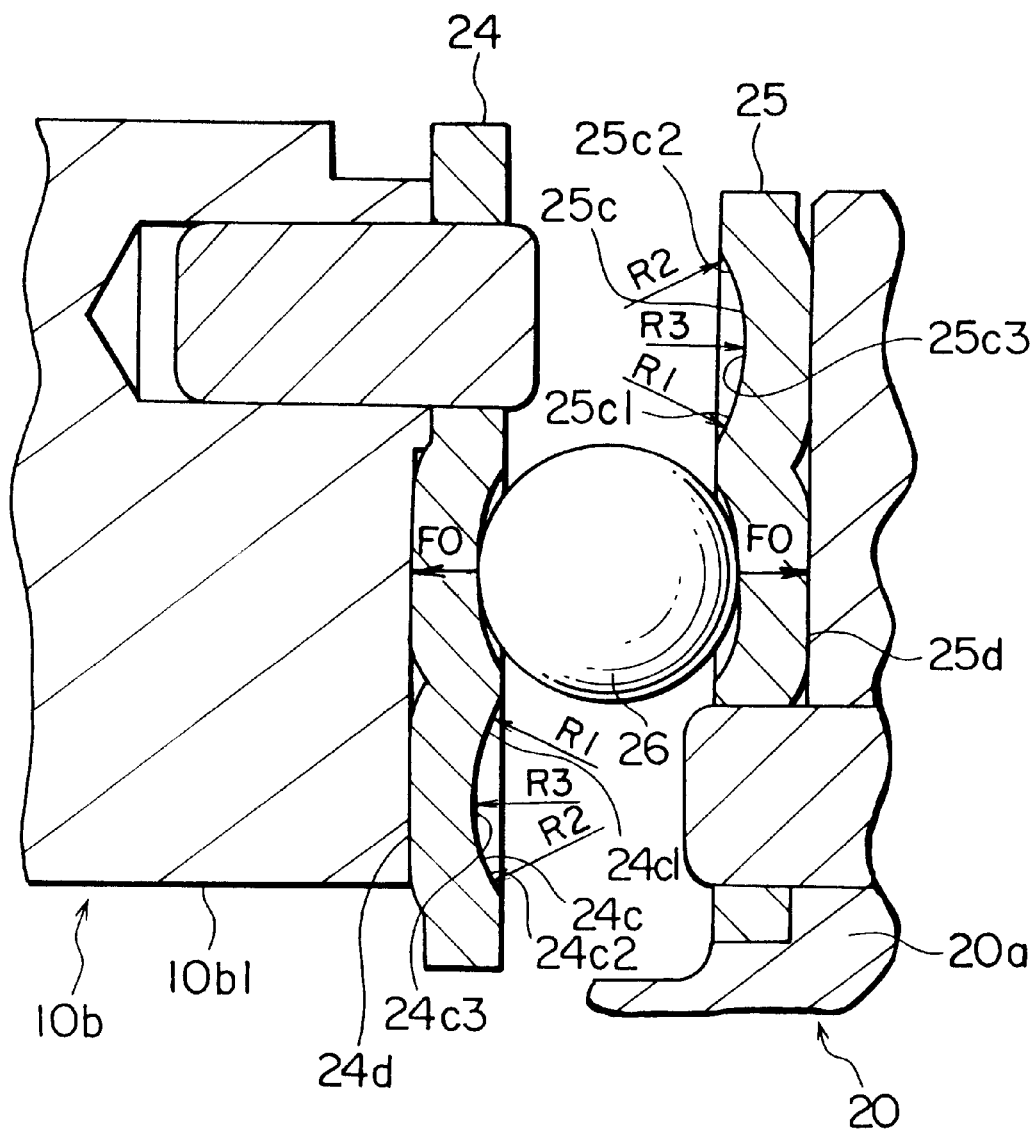
FIG. 5 is an enlarged view of a characteristic part of a rotation preventing mechanism according to a second embodiment of this invention.

Turning to FIG. 5, description will be made about a scroll-type compressor with a rotation preventing mechanism according to a second embodiment of this invention. Similar parts are designated by like reference numerals.

Referring to FIG. 5, each of the bottom portions 24c3 and 25c3 of the rolling groove surfaces 24c and 25c of the fixed-side race 24 and the movable-side race 25 has a radius of curvature R3 far greater than each of the radius of curvature R1 of the inner peripheral portions 24c1 and 25c1 and the radius of curvature R2 of the outer peripheral portions 24c2 and 25c2. In this case also, the bottom portions 24c3 and 25c3 are defined by the tangents of the inner peripheral portions 24c1 and 25c1 and the outer peripheral portions 24c2 and 25c2, respectively. With this structure, each of the rolling groove surfaces 24c and 25c has a continuously and smoothly curved surface as a whole so that local increase in surface pressure can be avoided. The radius of curvature R1 may be equal to or may be slightly different from the radius of curvature R2.

Thus, the bottom portions 24c3 and 25c3 of the rolling groove surfaces 24c and 25c need not be strictly flat. Specifically, it is sufficient that each of the bottom portions 24c3 and 25c3 is formed as the analytical-geometric curved surfaces having the radius of curvature greater than each of the radii of curvature R1 and R2 of the inner and the outer peripheral portions 24c1, 25c1 and 24c2, 25c2.

Figure 6:
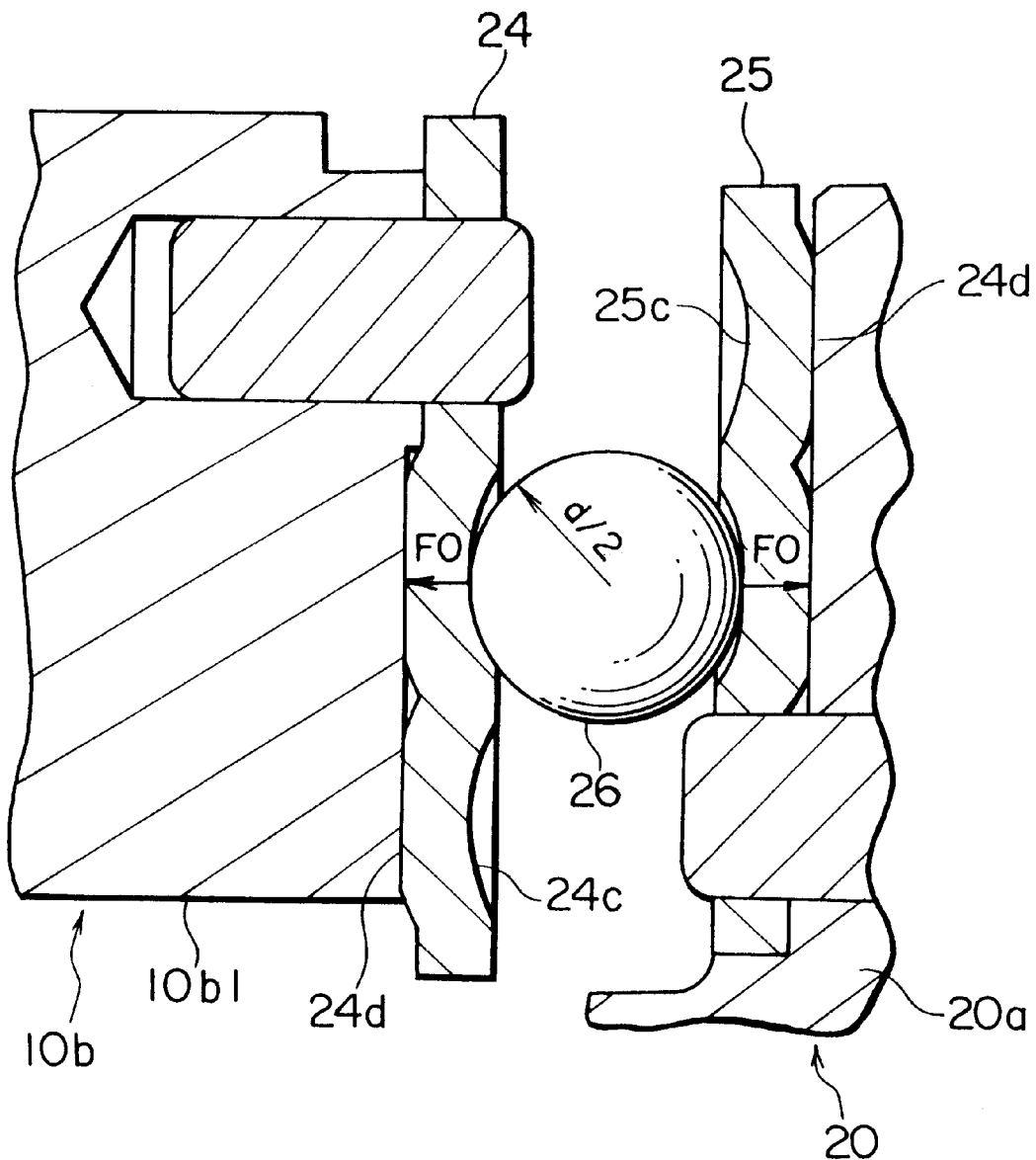
FIG. 6 is an enlarged view of a rotation preventing mechanist according to a third embodiment of this invention.

Turning to FIG. 6, description will be made about a scroll-type compressor with a rotation preventing mechanism according to a third embodiment of this invention. Similar parts are designated by like reference numerals.

In the rotation preventing mechanism illustrated in FIG. 6, each of the rolling groove surfaces 24c and 25c is a curved surface along an ellipse having a major axis oriented in the radial direction of the annular shape. Specifically, each of the rolling groove surfaces 24c and 25c is formed along a half of the ellipse formed by dividing the ellipse by the major axis. With this structure also, each of the rolling groove surfaces 24c and 25c has a continuously and smoothly curved surface. Therefore, local increase in surface pressure can be avoided. Each of the rolling groove surfaces 24c and 25c may be formed along a part of the ellipse formed by dividing the ellipse by a line parallel to the major axis.

Figure 7:
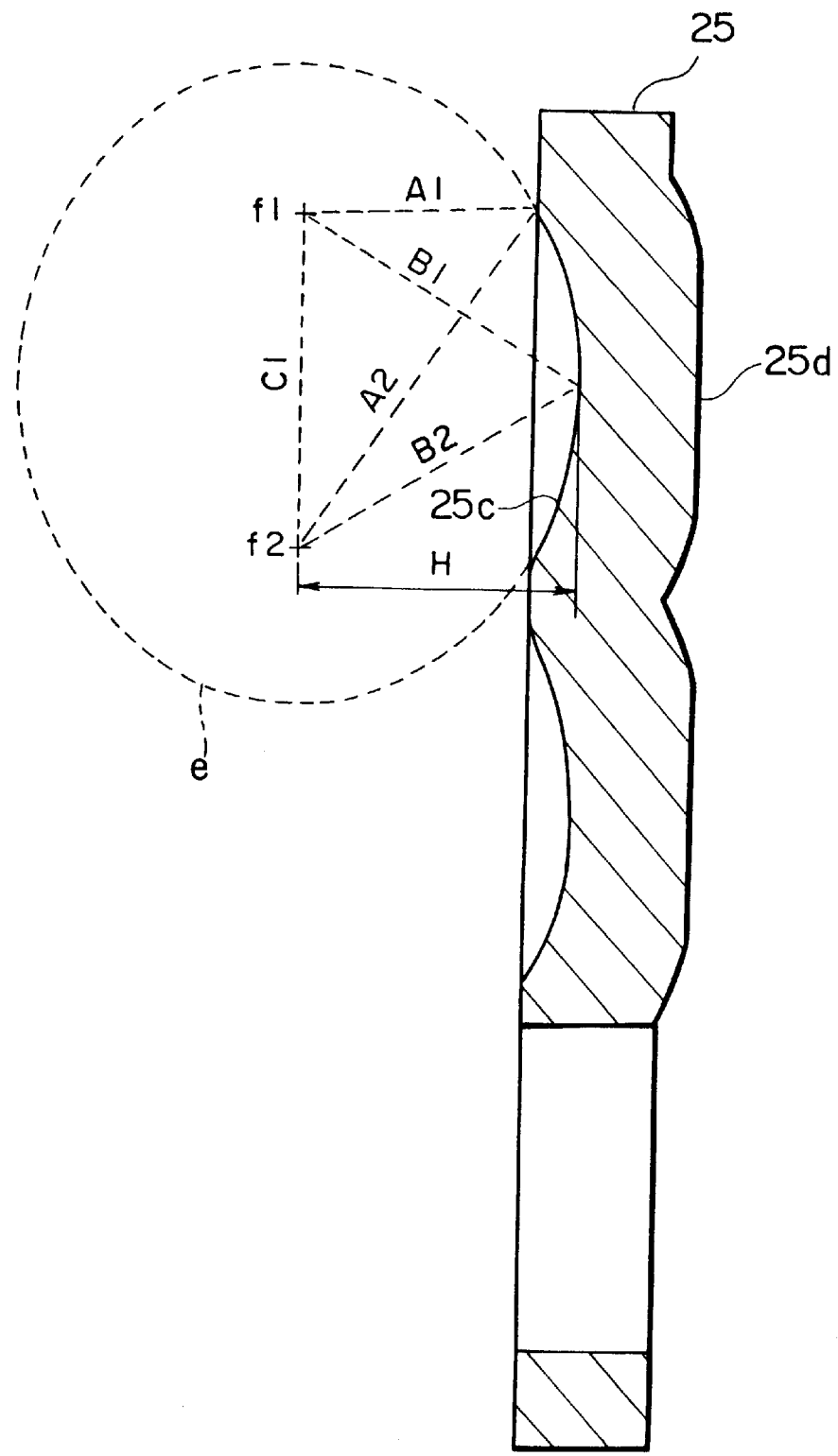
FIG. 7 is a view for describing the rotation preventing mechanism illustrated in FIG. 6.

Referring to FIG. 7, description will be made more in detail. It is assumed that the ball 26 has a diameter d. The distance H from the bottom of the rolling groove surface 25c to the loci f1 and f2 of the ellipse depicted at e is represented by:

$$H = (d/2) + r, (r \geq 0) \quad (1)$$

Let the distances from a point on the one surface of the movable-side race 25 at an edge of the rolling groove 25c to the loci f1 and f2 be represented by A1 and A2. The distances from the bottom of the rolling groove surface 25c to the loci f1 and f2 are represented by A2 and B1, respectively. The mutual distance between the loci f1 and f2 is represented by C1. In this event, the following equation is given:

$$A1 + A2 + C1 = B1 + B2 + C1. \quad (2)$$

Thus, the positions of the two loci f1 and f2 of the ellipse defining the rolling groove surface 25c of the movable-side race 25 can be calculated.

Although the movable-side race 25 is described in conjunction with FIG. 7, the foregoing also applies to the fixed-side race 24.

As described above, the rotation preventing mechanism prevents the ball 26 from climbing up on the outer or the inner peripheral portions 24c1, 25c1 and 24c2, 25c2 of the rolling groove surfaces 24c and 25c during rolling. Therefore, it is possible to achieve improvement in durability of the rotation preventing mechanism, stabilization in efficiency and improvement in productivity by optimization of an axial gap between the fixed and the movable scroll members, and suppression in wear of the rotation preventing mechanism.

While the present invention has thus far been described in connection with a few embodiments thereof, it will readily be possible for those skilled in the art to put this invention into practice in various other manners. For example, it is preferable that a width of the bottom portion is designed to include various errors regarding a shape of each of the fixed and the movable scroll members, a position of the race members, and a position of the rolling groove surface.

What is claimed is:

1. A rotation preventing mechanism for preventing an orbiting member from being rotated relative to a fixed member, said orbiting member carrying out orbital motion along a predetermined orbit with respect to said fixed member, said rotation preventing mechanism comprising a pair of races attached to said fixed and said orbiting members, respectively, to face each other, and a ball interposed between said races, each of said races having a rolling groove surface which has an annular shape corresponding to said predetermined orbit and receives said ball, said rolling groove surface comprising:

an outer peripheral portion having a first radius of curvature in a cross-section thereof, said first radius being approximate to and greater than a radius of said ball;

an inner peripheral portion having a second radius of curvature in a cross-section thereof, said second radius being approximate to and greater than a radius of said ball; and a bottom portion connected between said outer and said inner peripheral portions, said bottom portion having a curved surface with a third radius of curvature in a cross-section thereof, said third radius being greater than each of said first and said second radii.

2. A rotation preventing mechanism as claimed in claim 1, wherein said first radius is equal to said second radius.

3. A rotation preventing mechanism as claimed in claim 1, wherein said first radius is slightly different from said second radius.

4. A rotation preventing mechanism as claimed in claim 1, wherein said rolling groove surface is smoothly formed at a borderland between said bottom portion and each of said outer and said inner peripheral portions.

5. A rotation preventing mechanism as claimed in claim 1, wherein, at a bound between said bottom portion and each of said outer and said inner peripheral portions, said bottom portion has a tangent which extends along that of each of said outer and said inner peripheral portions.

6. A rotation preventing mechanism as claimed in claim 1, wherein said bottom portion has a bottom width in a radial direction of said annular shape, said bottom width being designed to include errors regarding a position of each of said fixed and said orbiting members, a position of said races, and a position of said rolling groove surface.

7. A rotation preventing mechanism as claimed in claim 1, further comprising a pair of race support members for supporting said races to said fixed and said orbiting members, respectively, each of races having a flat portion kept in contact with each of said race support members, said flat portion having a width greater than that of said bottom portion.

8. A rotation preventing mechanism for preventing an orbiting member from being rotated relative to a fixed member, said orbiting member carrying out orbital motion along a predetermined orbit with respect to said fixed member, said rotation preventing mechanism comprising a pair of races attached to said fixed and said orbiting members, respectively, to face each other, and a ball interposed between said races, each of said races having a rolling groove surface which has an annular shape corresponding to said predetermined orbit and receives said ball, said rolling groove surface having a cross-section along an ellipse having a major axis oriented in a radial direction of said annular shape.

9. A scroll-type fluid displacement apparatus comprising:

a rotation preventing mechanism as claimed in any one of claims 1–5 and 7–8;

a fixed scroll member connected to said fixed member; and a movable scroll member connected to said orbiting member and cooperated with said fixed scroll member for causing fluid displacement in response to said orbital motion of the orbiting member.

* * * * *